United States Patent
Xiong

(10) Patent No.: US 10,128,740 B1
(45) Date of Patent: Nov. 13, 2018

(54) DYNAMIC AC IMPEDANCE STABILIZATION IN A FLYBACK LED DRIVER

(71) Applicant: Universal Lighting Technologies, Inc., Madison, AL (US)

(72) Inventor: Wei Xiong, Madison, AL (US)

(73) Assignee: Universal Lighting Technologies, Madison, AL (US)

( * ) Notice: Subject to any disclaimer, the term of this patent is extended or adjusted under 35 U.S.C. 154(b) by 0 days.

(21) Appl. No.: 15/695,589

(22) Filed: Sep. 5, 2017

Related U.S. Application Data

(60) Provisional application No. 62/383,833, filed on Sep. 6, 2016.

(51) Int. Cl.
| | | |
|---|---|---|
| H05B 33/08 | (2006.01) |
| H02M 1/15 | (2006.01) |
| H02M 3/335 | (2006.01) |
| H02M 1/00 | (2006.01) |

(52) U.S. Cl.
CPC ......... *H02M 1/15* (2013.01); *H02M 3/33523* (2013.01); *H05B 33/0815* (2013.01); *H05B 33/0887* (2013.01); *H02M 2001/0009* (2013.01)

(58) Field of Classification Search
CPC ............. H02M 1/15; H02M 3/33523; H02M 2001/0009; H05B 33/0815; H05B 33/0887
See application file for complete search history.

(56) References Cited

U.S. PATENT DOCUMENTS

| | | | | |
|---|---|---|---|---|
| 7,233,258 B1* | 6/2007 | Gelinas | ............. | H05B 33/0815 340/815.45 |
| 8,344,638 B2* | 1/2013 | Shteynberg | ........ | H05B 33/0815 315/185 S |
| 8,698,849 B2* | 4/2014 | Woo | ................... | H05B 33/0827 345/102 |
| 8,884,541 B2* | 11/2014 | Wu | .................... | H05B 33/0815 315/219 |
| 9,780,638 B2* | 10/2017 | Simi | ....................... | H02M 1/32 |
| 9,917,524 B2* | 3/2018 | Fang | ....................... | H02M 1/15 |
| 2004/0003301 A1* | 1/2004 | Nguyen | .................. | G06F 1/206 713/300 |
| 2013/0107585 A1* | 5/2013 | Sims | ................. | H02M 3/33592 363/21.14 |
| 2014/0232270 A1* | 8/2014 | Kimura | ............. | H05B 33/0815 315/122 |

* cited by examiner

*Primary Examiner* — Alexander H Taningco
*Assistant Examiner* — Kurtis R Bahr
(74) *Attorney, Agent, or Firm* — Patterson Intellectual Property Law, P.C.; Gary L. Montle; Jerry Turner Sewell

(57) ABSTRACT

An apparatus and a method reduce the ripple on a load current through an LED load. The load current is provided by a flyback converter, which is responsive to a feedback signal to maintain the output current at or near a selected magnitude. The LED load has an AC resistance which is at least one cause of the ripple on the load current. A stabilizing resistor in the current path to the LED load reduces the magnitude of the ripple caused by the AC resistance. The stabilizing resistor may have a constant stabilizing resistance value for different LED loads; or the stabilizing resistor have a dynamic stabilizing resistance value such that the stabilizing resistance value is greater when the LED load has fewer LEDs and is smaller when the LED load has more LEDs.

8 Claims, 6 Drawing Sheets

DYNAMIC AC IMPEDANCE STABILIZATION IN A FLYBACK LED DRIVER

CROSS-REFERENCE TO RELATED APPLICATION

This application claims benefit of the following patent application, which is hereby incorporated by reference: U.S. Provisional Patent Application No. 62/383,833, filed Sep. 6, 2016, entitled "Dynamic AC Impedance Stabilization in a Flyback LED Driver."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The usage of light-emitting diodes (LEDs) to provide illumination is increasing rapidly as the cost of LEDs decrease and the endurance of the LEDs increases to cause the overall effective cost of operating LED lighting products to be lower than incandescent lamps and fluorescent lamps providing equivalent illumination. Also, LEDs can be dimmed by controlling the current through the LEDs because LEDs are current driven devices. The current through a plurality of LEDs in a lighting device must be controlled tightly in order to control the illumination provided by the LEDs. Typically, the secondary of an LED lighting device must be electrically isolated from the primary (line and neutral side) of the lighting device to meet applicable safety standards (e.g., IEC class II isolation). In addition, an LED driver circuit should have a high power factor and should have a constant current control.

One known solution to the foregoing requirements is to use a flyback converter to produce the DC in the secondary from the primary source. The flyback converter provides power factor correction to produce a high power factor, provides isolation between the primary and secondary circuits, and has a reasonably low cost. The flyback converter uses secondary current sensing techniques with feedback to the primary converter to control the secondary current through the LEDs. The flyback converter provides an LED driver that is low in cost when compared with other topologies.

FIG. 1 illustrates a traditional LED driver circuit 100 based on a flyback converter. The LED driver circuit includes a primary section 102 and a secondary section 104. The LED driver circuit provides current to an LED load 110. In the illustrated embodiment, the LED load may comprise from two to five LEDs 112 connected in series between a first (+) LED load terminal 114 and a second (−) LED load terminal 116. A common load current flows through each LED in the LED load to cause the LEDs to illuminate. In alternative embodiments, the LED load may comprise additional LEDs in series or a series-parallel combination of LEDs. In order to provide consistent illumination, the load current through the LEDs should be maintained at a substantially constant magnitude. The illustrated driver circuit utilizes a secondary current sensing technique (described below) to control the secondary current.

In the LED driver circuit 100, an AC source 120 provides an AC input voltage via a first AC input line 122 and a second AC input line 124. In the illustrated embodiment, the AC input voltage may vary from 86 volts RMS to 265 volts RMS. The AC input voltage between the first AC input line and the second AC input line is applied between a first input terminal 132 and a second input terminal 134 of a full-wave bridge rectifier 130. The bridge rectifier has a first (+) output terminal 136 and a second (−) output terminal 138. A first rectifier diode 140 has an anode connected to the first input terminal and a cathode connected to the first output terminal. A second rectifier diode 142 has an anode connected to the second input terminal and a cathode connected to the first output terminal. A third rectifier diode 144 has an anode connected to the second output terminal and has a cathode connected to the first input terminal. A fourth rectifier diode 146 has an anode connected to the second output terminal and has a cathode connected to the second input terminal. The bridge rectifier operates in a conventional manner to produce a pulsating DC voltage on the first output terminal which is referenced to the second output terminal. The second output terminal is connected to a primary ground reference 150.

The first (+) output terminal 136 of the bridge rectifier 130 is connected to a first terminal 164 of the primary winding 162 of an isolation transformer 160, which galvanically isolates the primary section 102 of the LED driver circuit 100 from the secondary section 104. The primary winding of the isolation transformer has a second terminal 166. The isolation transformer has a secondary winding 170, which has a first terminal 172 and a second terminal 174. The isolation transformer has an N:1 turns ratio between the primary winding and the secondary winding such that the voltage across the primary winding is N times the voltage across the secondary winding and such that the current through the secondary winding is N times the current through the primary winding.

As further illustrated in FIG. 1, the first terminal 172 of the secondary winding 170 of the isolation transformer 160 is connected to secondary ground reference 180. The secondary ground reference is electrically isolated from the primary ground reference 150 by the isolation transformer. The second terminal 174 of the secondary winding is connected to the anode of a secondary diode 182. The cathode of the secondary diode is connected to the first (+) terminal 186 of a secondary filter capacitor 184. The secondary filter capacitor may also be referred to as an output filter capacitor. A second (−) terminal 188 of the secondary filter capacitor is connected to the secondary ground reference and thus to the first terminal of the secondary winding of the isolation transformer. In one embodiment, the secondary filter capacitor has a capacitance of approximately 2,000 microfarads. The cathode of the secondary diode and the first terminal of the secondary filter capacitor are connected to a first (+) output terminal 190 of the LED driver circuit 100. The secondary ground reference is connected to a second (−) output terminal 192 of the LED driver circuit via a current sensing resistor 200.

As illustrated in FIG. 1, dots on the terminals of the primary winding 162 and the secondary winding 170 of the isolation transformer represent the magnetic coupling between the two windings. When the first terminal 164 of the primary winding is positive with respect to the second terminal 166 of the primary winding, the first terminal 172 of the secondary winding is also positive with respect to the second terminal 174 of the secondary winding; however, the current flow through the secondary winding is opposite the current flow through the primary winding. Thus, when current flows into the first terminal of the primary winding and flows to the second terminal of the primary winding with an increasing magnitude, the increasing current flow should induce current to flow from the second terminal of the secondary winding to the first terminal of the secondary winding (e.g., downward through the secondary winding toward the secondary ground reference 180) when the secondary winding terminals are oriented as shown in FIG. 1). However, induced current flow in that direction is blocked by the reverse-biased secondary diode 182. In contrast, when the magnitude of the current flowing from the first terminal to the second terminal of the primary winding decreases, current flow is induced in the secondary winding that flows from the first terminal of the secondary winding to the second terminal of the secondary winding (e.g., upward through the secondary winding when the secondary winding terminals are oriented as shown in FIG. 1). The current flowing out of the second terminal of the secondary winding passes through the forward-biased secondary diode and charges the secondary filter capacitor 184.

The first (+) output terminal 190 of the LED driver circuit 100 is connected to the first (+) terminal 114 of the LED load 110. The second (−) terminal 116 of the LED load is connected to the second (−) output terminal 192 of the LED driver circuit. Thus, the second terminal of the LED load is connected to the secondary ground reference 180 via the current sensing resistor 200. Accordingly, when an output current $I_{OUT}$ flows through the LED load, a voltage ($V_{ISENSE}$) develops across the current sensing resistor with respect to the secondary ground reference. The voltage across the current sensing resistor appears on the second (−) output terminal of the LED driver circuit. The sensed voltage is proportional to the magnitude of the current flowing through the LED load. In the illustrated LED driver circuit, the current sensing resistor is very small (e.g., approximately 0.1 ohm to approximately 3 ohms) such that the power loss in the resistor is very small (e.g., less than about 100 milliwatts) and such that the voltage drop across the current sensing resistor is also very small and does not substantially affect the voltage available to the LED load. For example, for a resistance of 0.1 ohm and a load current of approximately 180 milliamperes, the sensed voltage drop across the current sensing resistor is only approximately 18 millivolts. The current sensing resistor generates a voltage with respect to the secondary ground reference that is proportional to the current flowing through the sensing resistor.

It should be understood that the current sensing resistor 200 may be located at other positions in the current path from the filter capacitor 184 to the LED load 110 and back to the filter capacitor. The illustrated location with the sensing resistor in the current return path allows the voltage to be measured with respect to the secondary ground reference 180 using a single-ended amplifier (described below). Alternatively, the sensing resistor may be located, for example, between the first terminal of the filter capacitor and the first output terminal. In the absence of the connection to the secondary ground reference, the voltage across the sensing resistor may be measured by a differential amplifier.

The second (−) terminal 116 of the LED load 110 is also connected to an input terminal 212 of a sensing voltage amplifier (AMP) 210. In the illustrated embodiment, the sensing voltage amplifier may comprise a first conventional operational amplifier (OpAmp), which is configured as a single-ended amplifier to buffer and amplify the relatively small voltage developed across the current sensing resistor 200 with respect to the secondary ground reference 180 to provide an output voltage on an output terminal 214. In an alternative embodiment (not shown), the sensing voltage amplifier may be configured as a differential amplifier to sense the voltage across the sensing resistor without reference to the secondary ground reference.

The output terminal 214 of the sensing voltage amplifier 210 is connected to a first input terminal 222 of a voltage difference circuit (DIF) 220, which has a second input terminal 224 and an output terminal 226. The second input terminal of the voltage difference circuit is connected to an output terminal 232 of a reference source (REF) 230. In the illustrated embodiment, the voltage difference circuit may comprise a second conventional OpAmp, which is configured to output a voltage on the output terminal that is responsive to a difference between voltages on the first and second input terminals. The reference source provides a reference output voltage $V_{IREF}$ that is proportional to a desired current through the LED load. For example, in one embodiment of the driver circuit 100, the desired current through the LED load is 180 milliamps. The reference voltage corresponding to the desired current is selected such that when 180 milliamps flows through the current sensing resistor 200, the sensing voltage ($V_{ISENSE}$) developed across the current sensing resistor as amplified by the sensing voltage amplifier is substantially equal to the reference voltage ($V_{IREF}$). The voltage difference circuit outputs a first (nominal) voltage when the two input voltages are substantially equal. If the amplified sensing voltage differs from the reference voltage, the voltage difference circuit outputs a voltage having an amplitude that differs from the first voltage by a magnitude and a direction (e.g., more than or less than the first voltage) responsive to the difference between the two input voltages. For example, in one embodiment, the first (nominal) voltage may be set to approximately one-half of the rail-to-rail supply voltage of the second OpAmp such that the output of the second OpAmp is a voltage that varies with respect to the nominal voltage.

The output voltage on the output terminal 226 of the voltage difference circuit 220 is provided as an input to an optical isolator (e.g., an optical coupler) 240. For example, in the illustrated embodiment, the output of the voltage difference circuit is connected to the anode of an input LED 242 of the optical isolator. The cathode of the input LED of the optical isolator is connected to the secondary ground reference 180 via a current limiting resistor 244. The optical isolator has an optically isolated output transistor 250 that controls a collector-emitter voltage in response to the magnitude of the current flowing through the input LED. The emitter of the output transistor is connected to the primary ground 150 via an emitter biasing resistor 252. The collector of the output transistor is connected to a first terminal of a pullup resistor 262 at a primary feedback node 260. A second terminal of the pullup resistor is connected to a logic circuit supply voltage ($V_{CC}$). The operation of the optical isolator causes the voltage at the collector of the output transistor—and thus the voltage at the primary feedback node—to vary in response to the output voltage of the voltage difference circuit. Thus, the voltage at the primary feedback node has a magnitude that represents the difference between the two input voltages on the inputs of the voltage difference circuit.

As further shown in FIG. 1, the second terminal 166 of the primary winding 162 of the isolation transformer 160 is connected to a first terminal 302 of a semiconductor switch 300. The switch further includes a second terminal 304 and a control terminal 306. For example, the semiconductor switch may comprise a metal oxide semiconductor field effect transistor (MOSFET) wherein the first terminal is the drain of the MOSFET, the second terminal is the source of the MOSFET, and the control terminal is the gate of the MOSFET. In the illustrated embodiment, the MOSFET is an N-channel enhancement mode transistor, which has is normally off (e.g., has a high impedance between the drain and the source). The MOSFET turns on to provide a low-impedance path (e.g., a few tens of milliohms) between the drain and the source when a sufficiently large voltage differential is applied between the gate and the source of the MOSFET. The second terminal (source) of the MOSFET is connected to the primary ground reference 150. When the MOSFET is turned on, a current flows from the first (+) output terminal 136 of the bridge rectifier 130, through the primary winding 162 of the isolation transformer 160, through the MOSFET from the first terminal (drain) to the second terminal (source), and to the primary ground reference.

The control terminal (gate) 306 of the MOSFET 300 is controlled by a gate drive (GD) output terminal 322 of a switch controller integrated circuit ("switch controller IC") 320. In the illustrated embodiment, the switch controller IC comprises an L6562 transition-mode power factor correction (PFC) controller, which is commercially available from STMicroelectronics of Geneva, Switzerland. The switch controller IC receives a feedback voltage via a feedback input terminal (INV) 324, which is connected to the primary feedback node 260. Thus, the switch controller IC receives a voltage responsive to the difference between the instantaneous LED load current flowing through the current sensing resistor 200 and the desired LED load current. The switch controller IC further includes a zero-crossing detector (ZCD) input terminal 330 that is connected to a first terminal 334 of a third (auxiliary) winding 332 of the isolation transformer 160 via a resistor 338. A second terminal 336 of the third winding is connected to the primary ground reference 150. The auxiliary winding produces a voltage responsive to the voltage on the primary winding 164 of the isolation transformer. Circuitry within the switch controller IC 320 detects when the voltage on the auxiliary winding is at zero volts, and modifies the internal switching operations to control the power factor of the line current in a known manner. Information regarding the power factor control function of the switch controller IC is provided by the manufacturer. The power factor control function is not pertinent to the present disclosure. The switch controller IC includes additional inputs (e.g., power input, ground reference, and compensation inputs), which are not shown in FIG. 1.

The switch controller IC 320 operates in a conventional manner to output a high output signal on the gate control output terminal 322 to turn on the MOSFET 300 to cause current to flow through the primary winding 162 of the isolation transformer 160 from the first terminal 164 to the second terminal 166 of the primary winding. The switch controller IC output a low output signal on the gate control output terminal to turn off the MOSFET to stop current flow through the primary winding of the transformer. The time varying current flow through the primary winding generates current flow in the secondary winding 170, which is rectified by the secondary diode 182 and which is applied to the secondary filter capacitor 184 to thereby charge the secondary filter capacitor. The voltage across the secondary filter capacitor is applied to the LED load 110 to cause the output current $I_{OUT}$ to flow through the load.

The output current $I_{OUT}$ flowing through the LED load 110 is sensed by the current sensing resistor 200. The voltage $V_{ISENSE}$ representing the sensed current is amplified and compared to a reference signal to produce a feedback signal, which is applied to the feedback input (INV) of the switch controller IC, as described above. The switch controller IC is responsive to the feedback signal to switch the MOSFET on and off with varying durations to adjust the voltage across the secondary filter capacitor to a magnitude sufficient to cause the current flowing through the LED load to have a desired magnitude (e.g., 180 milliamps in the illustrated example). Note that although the operation of the switch controller IC determines the voltage across the secondary filter capacitor, the actual voltage across the LED load required to maintain the desired current through the LED load varies with the characteristics of the LEDs within the LED load and also varies with other factors such as, for example, temperature. Thus, it should be understood that the sensed output current through the LED load is the controlled parameter. The secondary voltage across the LED load may vary to maintain the sensed current magnitude at or near the desired output current magnitude (e.g., at approximately 180 milliamperes in certain embodiments).

The LED driver circuit 100 shown in FIG. 1 uses the flyback converter with secondary current sensing to provide a simple and cost effective way to control the current through the LED load 110; however, testing has shown that the circuit in FIG. 1 does not provide adequate current regulation over a wide range of input voltages and over a range of the number of LEDs 112 in series within in the LED load. Furthermore, the ripple in the output current through the LED load may be excessive under certain load condition. For example, at lighter loads (e.g., fewer LEDs in the LED load 100), the ripple percentage increases and the range of output currents applied to the load increases.

The foregoing is illustrated in Table 1, which shows the effects on the output current caused by changing the number of LEDs connected in series within the LED load 110. In the following table, the secondary filter capacitor 184 has a capacitance of approximately 2,000 microfarads, and each LED has a nominal forward voltage of between 2.75 volts and 2.8 volts.

TABLE 1

| No. of LEDs | $I_{OUT\_AVG}$ (mA) | $I_{OUT\_MAX}$ (mA) | $I_{OUT\_MIN}$ (mA) | $V_{OUT}$ (volts) | Ripple (%) |
|---|---|---|---|---|---|
| 5 | 180 | 209 | 150 | 13.86 | 16.11 |
| 4 | 180 | 220 | 149 | 11.1 | 22.22 |
| 3 | 180 | 235 | 145 | 8.4 | 30.56 |
| 2 | 180 | 255 | 143 | 5.6 | 41.67 |

As illustrated in Table 1, the target output current through the LED load 100 is 180 milliamps. The input voltages from the AC source 120 range from approximately 86 volts RMS to approximately 265 volts RMS. In the illustrated embodiment, the LED load 110 may include as few as two LEDs 112 in series (requiring approximately 5.6 volts across the LED load) to as many as five LEDs in series (requiring approximately 13.9 volts across the LED load). The testing data in Table 1 show that when the LED load includes 5 LEDs in series, the LED driver circuit 100 is able to maintain the output current through the LED load within a range from 150 milliamps to 209 milliamps—a range from 30 milliamps less than the nominal current to 29 milliamps greater than the nominal current. With 5 LEDs in the LED load, the ripple in the output current is approximately 16.11%.

Decreasing the number of LEDs in the LED load 110 decreases the voltage across the LED load. At lower load voltages, the flyback converter in the LED driver 100 is unable to regulate the output current and control the ripple in the output current as well as at the higher load voltage. For example, with only 4 LEDs in series having an overall load voltage of approximately 11.1 volts, the output current varies over a greater range of magnitude from approximately 149 milliamps to approximately 220 milliamps; and the output current has a ripple of approximately 22.22%. With only 2 LEDs in series having an overall load voltage of approximately 5.6 volts, the output current varies over an even greater range of magnitudes from approximately 143 milliamps to approximately 255 milliamps; and the output current has a ripple of approximately 41.67%.

The maximum current of 255 milliamps in Table 1 exceeds a typical peak current rating of 240 milliamps for an LED having a nominal current rating of 180 milliamps. Furthermore, the ripple of the load current for each system with fewer than 5 LEDs in series exceeds a typical requirement that the ripple on the current through the LEDs be less than 20%. Accordingly, a need exists to be able to operate the flyback converter in the LED driver 100 with as few as 2 LEDs in series while maintaining the maximum current through the LEDs at or below 240 milliamps, and also to operate the flyback converter with as few as 2 LEDs in series while maintaining the ripple on the current to less than 20%.

One simple way of reducing the ripple is to increase the capacitance of the secondary filter capacitor 184. For example, the capacitance can be increased to 4,000 microfarads. Although this solution may be simple in concept, the solution is costly economically and increases circuit board space, increases component height or increases both circuit board space and component height. Electrolytic capacitors with greater capacitance typically cost more and occupy more volume. The increased volume may require a larger diameter on a printed circuit board or may require a greater height above a printed circuit board or may require both a greater board area and a greater height. Accordingly, a solution is desired that reduces the current ripple and improves the current regulation without increasing the capacitance of the secondary filter capacitor.

SUMMARY OF THE INVENTION

An aspect of the embodiments disclosed herein is an apparatus and a method to reduce the ripple on a load current through an LED load. The load current is provided by a flyback converter, which is responsive to a feedback signal to maintain the output current at or near a selected magnitude. The LED load has an AC resistance which is at least one cause of the ripple on the load current. A stabilizing resistor in the current path to the LED load reduces the magnitude of the ripple caused by the AC resistance. The stabilizing resistor may have a constant stabilizing resistance value for different LED loads; or the stabilizing resistor have a dynamic stabilizing resistance value such that the stabilizing resistance value is greater when the LED load has fewer LEDs and is smaller when the LED load has more LEDs.

Another aspect of the embodiments disclosed herein is a drive circuit for providing a load current to a load having an AC resistance. The drive circuit comprises an isolation transformer, which includes a primary winding and a secondary winding. A flyback converter controller is configured to selectively apply a pulsing DC voltage to the primary winding of the isolation transformer to generate a current in the secondary winding of the isolation transformer. A diode coupled to the secondary winding of the isolation transformer is configured to provide a rectified secondary current. A secondary filter capacitor is coupled to receive the rectified secondary current. The secondary filter capacitor includes a first capacitor terminal and a second capacitor terminal. A first output terminal is coupled to the first capacitor terminal, and a second output terminal is coupled to the second capacitor terminal. The first and second output terminals are connectable to a load to provide a current path for a load current between the secondary filter capacitor and the load. A current sensing circuit is coupled to the current path to sense a magnitude of the load current and to provide a feedback signal to the flyback converter. The flyback converter is responsive to the feedback signal to control the pulsing DC voltage to the primary of the isolation transformer to thereby control the magnitude of the load current. The load current includes an AC ripple superimposed on an average DC current. The AC ripple has a magnitude inversely responsive to the AC resistance of the load. A stabilizing resistance is connected in the current path. The stabilizing resistance has a resistance value selected to be much greater than the minimum AC resistance of the load connected between the first and second output terminals. In certain embodiments in accordance with this aspect, the resistance value of the stabilizing resistance is at least 10 times the minimum AC resistance of the load. In certain embodiments in accordance with this aspect, the resistance value of the stabilizing resistance is at least 40 times the minimum AC resistance of the load. In certain embodiments in accordance with this aspect, the current sensing circuit includes a current sensing resistor in the current path; and the stabilizing resistance comprises a stabilizing resistor connected in series with the current sensing resistor in the current path. In certain embodiments in accordance with this aspect, the current sensing circuit includes a current sensing resistance in the current; and the current sensing resistance and the stabilizing resistance are provided by a single resistor having the resistance value selected to be much greater than the minimum AC resistance of the load. In certain embodiments in accordance with this aspect, the current sensing circuit includes a current sensing resistor in the current path; and the stabilizing resistance is a dynamic resistance connected in series with the sensing resistor in the current path. The dynamic resistance is responsive to a voltage across the first and second output terminals. The dynamic resistance has a first resistance value when the voltage across the first and second output terminals is below a threshold voltage, and has a second resistance value when the voltage across the first and second output terminals is at least as great as the threshold voltage. The first resistance value is much greater than the second resistance value. In certain embodiments in accordance with this aspect, the dynamic resistance comprises a stabilizing resistor having the first resistance value. The stabilizing resistor is connected in series with the sensing resistor in the current path. A semiconductor switch includes a controlled conduction path connected across the stabilizing resistor. The semiconductor switch includes a control terminal responsive to a control input voltage to selectively turn on the controlled conduction path and apply a low resistance across the stabilizing resistor. A control input circuit provides a control voltage to the control input terminal of the semiconductor switch. The control input circuit is responsive to a load voltage between the first output terminal and the second output terminal to generate a first control voltage to the control input terminal to turn on the semiconductor switch when the load voltage is above a threshold voltage and to generate a second control voltage to the control input terminal to turn off the semiconductor switch when the load voltage is below the threshold voltage. In certain embodiments in accordance with this aspect, the load comprises light-emitting diodes (LEDs) connected in series. The threshold voltage is greater than a total forward voltage across a first number of LEDs in series and is less than total forward voltage across a second number of LEDs in series. The second number of LEDs in series is one greater than the first number of LEDs in series.

Another aspect of the embodiments disclosed herein is a drive circuit for providing a load current to a load having an AC resistance. The drive circuit comprises a current source configured to generate an output current having a nominal DC magnitude between a first output terminal and a second output terminal. The output current varies with respect to the nominal DC magnitude by a time-varying ripple magnitude responsive at least in part to the AC resistance of a load connectable between the first output terminal and the second output terminal. A current sensing circuit senses a magnitude of the output current and generates a feedback signal to the current source responsive to the magnitude of the output current. The current source is responsive to the feedback signal to maintain the magnitude of the output current at or near a selected magnitude. A stabilizing resistance is connected in a current path from the current source to at least one of the first and second output terminals. The stabilizing resistance has a resistance magnitude much greater than a minimum AC resistance of a load couplable to the first and second output terminals. In certain embodiments in accordance with this aspect, the resistance value of the stabilizing resistance is at least 10 times the minimum AC resistance of the load. In certain embodiments in accordance with this aspect, the resistance value of the stabilizing resistance is at least 40 times the minimum AC resistance of the load. In certain embodiments in accordance with this aspect, the current sensing circuit includes a current sensing resistor in the current path; and the stabilizing resistance comprises a stabilizing resistor connected in series with the current sensing resistor in the current path. In certain embodiments in accordance with this aspect, the current sensing circuit includes a current sensing resistance in the current path; and the current sensing resistance and the stabilizing resistance are provided by a single resistor having the resistance magnitude selected to be much greater than the minimum AC resistance of the load. In certain embodiments in accordance with this aspect, the current sensing circuit includes a current sensing resistor in the current path; and the stabilizing resistance is a dynamic resistance connected in series with the sensing resistor in the current path. The dynamic resistance is responsive to a voltage across the first and second output terminals. The dynamic resistance has a first resistance value when the voltage across the first and second output terminals is below a threshold voltage. The dynamic resistance has a second resistance value when the voltage across the first and second output terminals is at least as great as the threshold voltage. The first resistance value much greater than the second resistance value. In certain embodiments in accordance with this aspect, the dynamic resistance comprises a stabilizing resistor having the first resistance value. The stabilizing resistor is connected in series with the sensing resistor in the current path. A semiconductor switch includes a controlled conduction path connected across the stabilizing resistor. The semiconductor switch includes a control terminal responsive to a control input voltage to selectively turn on the controlled conduction path and apply a low resistance across the stabilizing resistor. A control input circuit that provides a control voltage to the control input terminal of the semiconductor switch, the control input circuit responsive to a load voltage between the first output terminal and the second output terminal to generate a first control voltage to the control input terminal to turn on the semiconductor switch when the load voltage is above a threshold voltage and to generate a second control voltage to the control input terminal to turn off the semiconductor switch when the load voltage is below the threshold voltage. In certain embodiments in accordance with this aspect, the load comprises light-emitting diodes (LEDs) connected in series; and. The threshold voltage is greater than a total forward voltage across a first number of LEDs in series and is less than total forward voltage across a second number of LEDs in series. The second number of LEDs in series is one greater than the first number of LEDs in series.

Another aspect of the embodiments disclosed herein is a method for controlling a load current to a light-emitting diode (LED) load. The LED load includes a plurality of LEDs connected in series. The plurality of LEDs have an AC resistance. The method comprises operating a flyback converter circuit to generate an output current; and applying the output current to the LED load. The method further comprises sensing the magnitude of the output current applied to the LED load and generating a feedback signal to the flyback converter responsive to the magnitude of the output current. The flyback converter is responsive to the feedback signal to control the output current to a controlled current magnitude at or near a selected current magnitude. The controlled current magnitude includes an AC ripple with respect to the controlled current magnitude. The AC ripple has a ripple magnitude responsive at least in part to the AC resistance of the LED load. The method further comprises passing the output current through a stabilizing resistance. The stabilizing resistance has a resistance value much greater than the AC resistance of the LED load. The stabilizing resistance reduces the ripple magnitude. In certain embodiments in accordance with this aspect, the resistance value of the stabilizing resistance is at least 10 times a minimum AC resistance of the load. In certain embodiments in accordance with this aspect, the magnitude of the output current is sensed by a current sensing resistor, and the stabilizing resistance is provided by a stabilizing resistor connected in series with the current sensing resistor. In certain embodiments in accordance with this aspect, the magnitude of the output current applied to the LED load is sensed by a current sensing resistor in the current path; the stabilizing resistance is a dynamic resistance connected in series with the sensing resistor in the current path; and the dynamic resistance is responsive to a voltage across the first and second output terminals. The dynamic resistance has a first resistance value when the voltage across the first and second output terminals is below a threshold voltage, and has a second resistance value when the voltage across the first and second output terminals is at least as great as the threshold voltage. The first resistance value is much greater than the second resistance value.

DETAILED DESCRIPTION OF THE INVENTION

Figure 1:
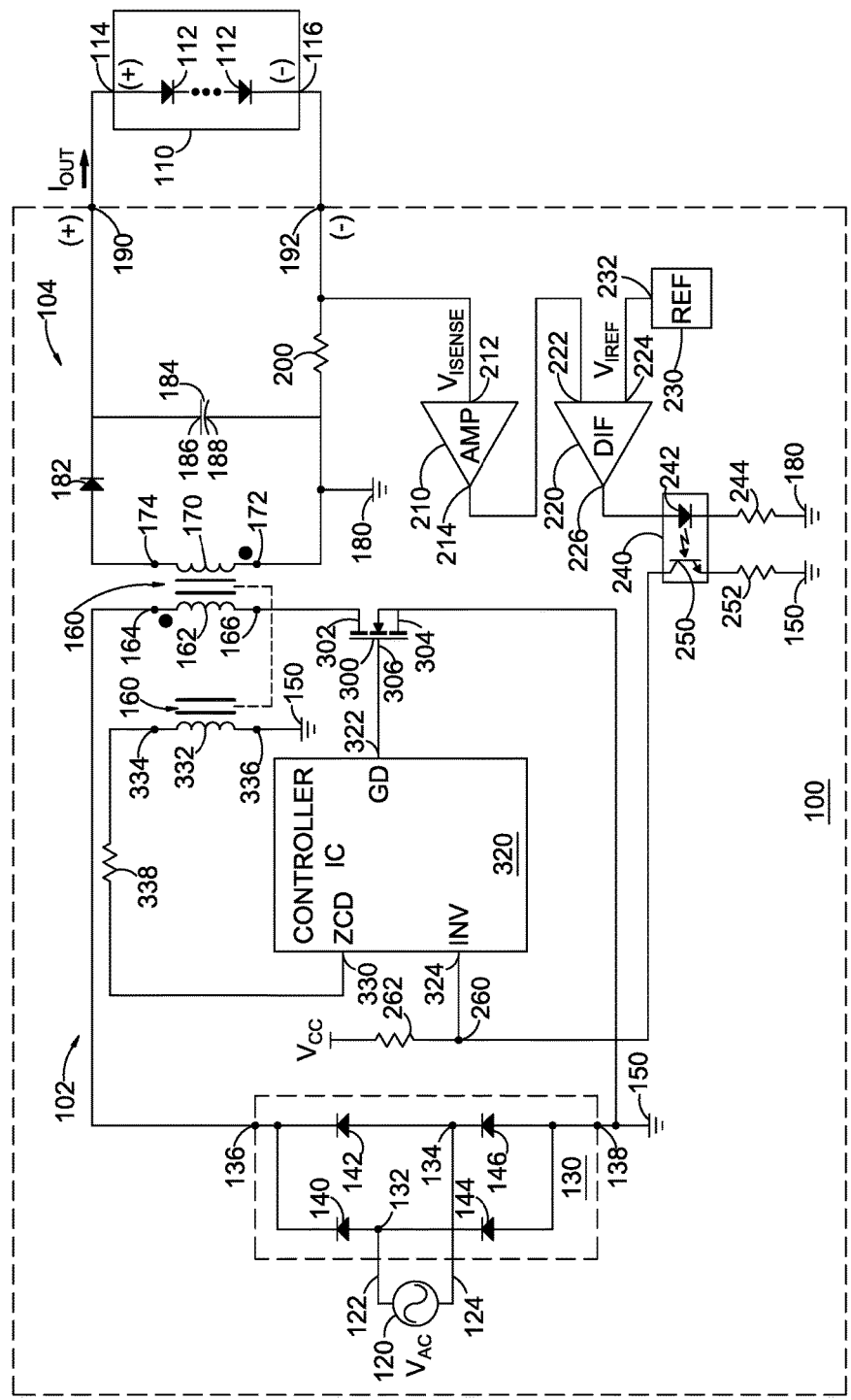
FIG. 1 illustrates a circuit diagram of a conventional LED driver circuit that includes a flyback converter controller on the primary of an isolation transformer and that provides a rectified secondary current to charge an output capacitor, the output capacitor providing current to an LED load.
Figure 2:
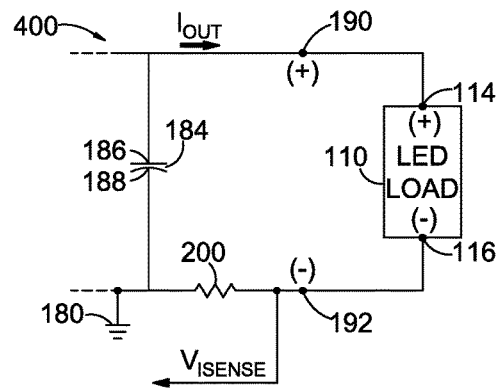
FIG. 2 illustrates a simplified circuit diagram of the secondary filter capacitor in the output section of the LED driver circuit, the LED load, and the current sensing resistor of FIG. 1.

To assist in further understanding the problem described above, the secondary filter capacitor 184 in the secondary section 104 of the driver circuit 100 of FIG. 1 is shown in an equivalent circuit 400 in FIG. 2 as supplying an output current $I_{OUT}$ to the LED load 110. The output current returns to the secondary filter capacitor via the current sensing resistor 200 as described above. The voltage $V_{ISENSE}$ measured across the current sensing resistor is proportional to the output current through the LED load as discussed above. Accordingly, for the purpose of the following discussion, the measured voltage has a magnitude that represents $I_{OUT}$ through the LED load. The following discussion will therefore refer to $I_{OUT}$ as the measured parameter. The LED driver circuit of FIG. 1 controls the current through the LED load in the manner described above. Thus, the output current $I_{OUT}$ exhibits the issues with current regulation and ripple described above with respect to Table 1.

Figure 3:
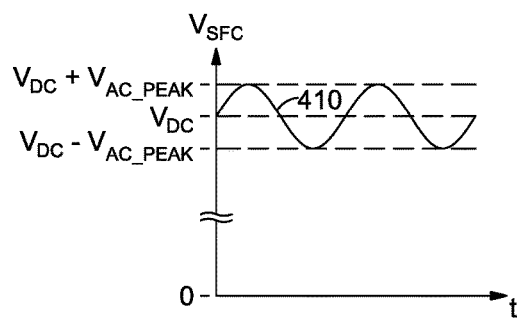
FIG. 3 illustrates a graphical representation of the time-varying voltage across the secondary filter capacitor of FIG. 2, the time-varying voltage illustrating the ripple voltage superimposed on the average DC voltage.
Figure 4:
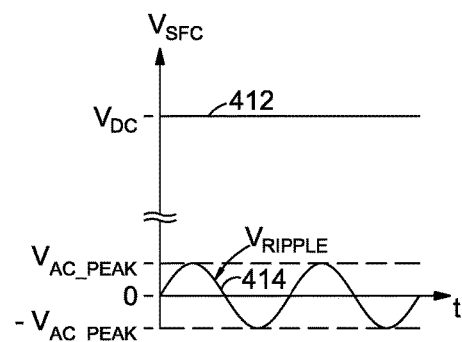
FIG. 4 illustrates the graphical representation of the time-varying voltage of FIG. 3 with the DC component and the AC component separated.

FIG. 3 illustrates a voltage waveform 410 that represents the voltage $V_{SFC}$ across the secondary filter capacitor (SFC) 184. As shown in FIG. 4, the voltage waveform of FIG. 3 includes a DC component $V_{DC}$—illustrated as a constant magnitude line 412—that represents an average DC value of the voltage on the secondary filter capacitor. As further shown in FIG. 4, subtracting the DC component value $V_{DC}$ from the voltage $V_{SFC}$, results in a time-varying AC voltage waveform 414 that represents a ripple voltage $V_{RIPPLE}$. As illustrated, the ripple voltage varies by $\pm V_{AC\_PEAK}$ with respect to the average DC component $V_{DC}$. The ripple voltage is caused, at least in part, by the inability of the flyback converter to maintain a constant DC voltage on the secondary filter capacitor.

Figure 5:
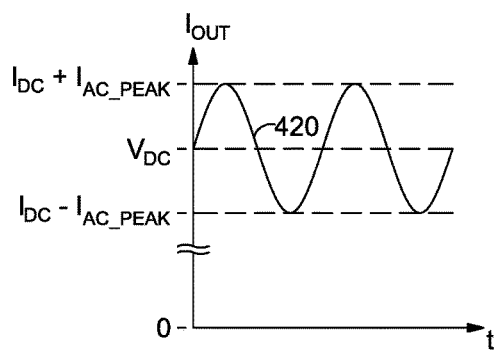
FIG. 5 illustrates the time-varying current through the LEDs in the LED driver circuit FIG. 2 caused by the time-varying voltage of FIGS. 3 and 4, the time-varying current illustrating the ripple current superimposed on the average DC output current.
Figure 6:
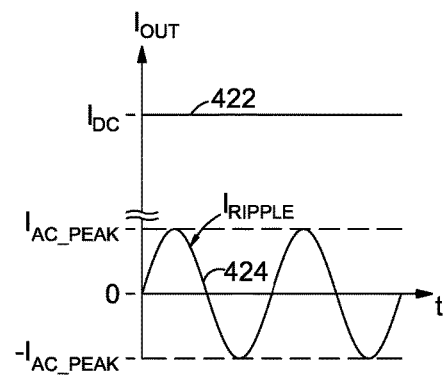
FIG. 6 illustrates the graphical representation of the time-varying current of FIG. 5 with the DC component and the AC component separated.

FIG. 5 illustrates a current waveform 420 that represents the output current $I_{OUT}$ through the LED load 110. Similar to the voltage waveform of FIG. 3, the current waveform of FIG. 5 includes a DC component $I_{DC}$—illustrated as a constant magnitude line 422 in FIG. 6. As further shown in FIG. 6, subtracting the DC component value $I_{DC}$ from the output current $I_{OUT}$, results in a time-varying AC current waveform 424 that represents the ripple current $I_{RIPPLE}$. As illustrated, the ripple current varies by $\pm I_{AC\_PEAK}$ with respect to the average DC component $I_{DC}$.

Figure 7:
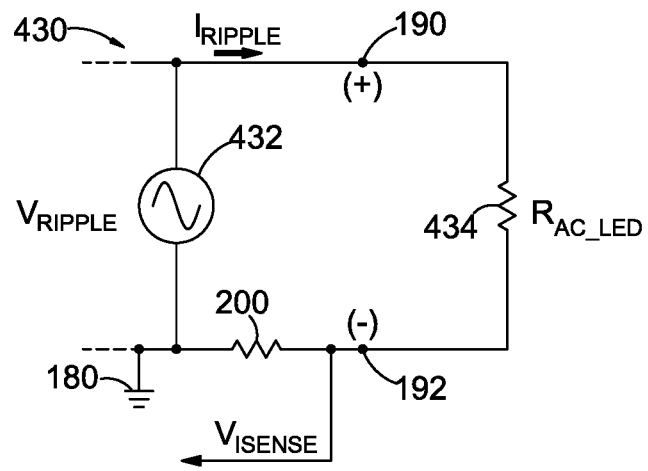
FIG. 7 illustrates a simplified circuit diagram of an AC source that represents the voltage ripple on the secondary filter capacitor in the output section of the LED driver circuit as an AC voltage source; that represents the LED load as a dynamic AC resistance responsive only to the AC ripple voltage; and that includes the current sensing resistor of FIG. 1 in the current return path to the secondary filter capacitor.

For dynamic analysis, the AC signals are extracted from the overall equivalent circuit 400 of FIG. 2 to form an AC-equivalent circuit 430 shown in FIG. 7. The AC equivalent circuit is used in the following discussion to analyze the ripple voltage and the ripple current. In the AC equivalent circuit, the AC ripple voltage on the secondary filter capacitor 184 is represented as an AC voltage source 432 that produces the voltage $V_{RIPPLE}$ described above. The dynamic AC resistance of the series-connected LEDs in the LED load 110 is represented as a resistor 434 having a resistance of $R_{AC\_LED}$. The current sensing resistor 200 is illustrated as before. The ripple current through the LED load is shown as $I_{RIPPLE}$.

The magnitude of the AC ripple voltage $V_{RIPPLE}$ of the AC voltage source 422 can be approximated by the following Equation (1):

$$V_{RIPPLE} = k \times \frac{I_{DC} \times \frac{1}{\pi \times f_{LINE}}}{C_{SFC}} \quad (1)$$

In Equation (1), $C_{SFC}$ is the capacitance of the secondary filter capacitor 184, and $f_{LINE}$ is the nominal frequency of the AC source 120 in FIG. 1. As indicated by Equation (1), the magnitude of the ripple voltage is not determined by the dynamic AC load resistance of the LEDs in the LED load 100. Rather, if the DC current is maintained at a constant magnitude (e.g., 180 milliamps in the illustrated embodiment), the ripple voltage across the secondary filter capacitor remains constant.

The dynamic AC resistance of the LEDs in the LED load 110 can be derived as set forth in the following Equations (2) and (3):

$$I_{RIPPLE} = I_0 \times \left(e^{\frac{V}{\eta V_T}} - 1\right) \quad (2)$$

$$R_{AC\_LED} = \frac{dV}{dI_{RIPPLE}} = \frac{\eta V_T}{I_0 \times e^{\frac{V}{\eta V_T}}} = \frac{\eta V_T}{I_0 + I_{DC}} \quad (3)$$

Equation (2) represents the relationship between the current through and the voltage across an LED. In Equation (2)

$I_0$, $V_T$ and $\eta$ are constants, wherein $\eta=1$ for a germanium diode, $V_T=26$ millivolts, and $I_0$ is less than 0.1 milliamp.

Equation (3) represents the dynamic AC resistance for an LED. When $\eta=1$ and $I_{DC} \gg I_0$, Equation (3) can be simplified to the following Equation (4):

$$R_{AC\_LED} = \frac{V_T}{I_{DC}} \quad (4)$$

Using Equation (4) when the nominal DC current, $I_{DC}$, is approximately 180 milliamps, the dynamic AC resistance of an LED can be calculated in accordance with the following Equation (5):

$$R_{AC\_LED} = \frac{0.026 \text{ V}}{0.18 \text{ A}} = 0.15 \, \Omega \quad (5)$$

For 5 LEDs in the LED load 110, the total dynamic AC resistance is approximately 5×0.15 ohm=0.75 ohm. For 4 LEDs in the LED load, the total dynamic AC resistance is approximately 0.6 ohm. For 3 LEDs in the LED load, the total dynamic AC resistance is approximately 0.45 ohm. For 2 LEDs in the LED load, the total dynamic resistance is approximately 0.3 ohm.

Using the AC-equivalent circuit 420 in FIG. 7, the ripple current can be determined in accordance with the following Equation (6):

$$I_{RIPPLE} = \frac{V_{RIPPLE}}{R_{AC\_LED}} \quad (6)$$

Equation (6) shows that the magnitude of the ripple current is a function of the magnitude of the ripple voltage and the total dynamic AC resistance of the LED load 110. If the magnitude of the ripple voltage is held constant, the magnitude of the ripple current will increase as the total dynamic resistance of the LED load decreases. For example, reducing the number of LEDs in the LED load from 5 LEDs to 2 LEDs will multiple the magnitude of the ripple current by approximately 5/2=2.5 times. This calculated increase is reasonably consistent with the measured ripple values in Table 1, wherein the ripple percentage of 41.67% for 2 LEDS is approximately 2.59 times the ripple percentage of 16.11% for 5 LEDs.

The foregoing discovery forms the basis for a dynamic AC resistance stabilizer, embodiments of which are illustrated in FIGS. 8-11 and which are described in the following paragraphs.

Figure 8:
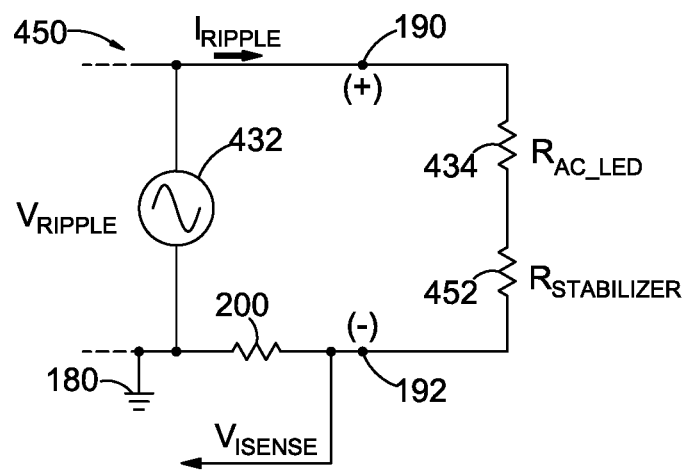
FIG. 8 illustrates the simplified circuit diagram of FIG. 7 modified to include a stabilizing resistor in the current return path from the LED load.

FIG. 8 illustrates a modified AC equivalent circuit 450, which is similar to the AC equivalent circuit 430 of FIG. 7. The modified AC equivalent circuit further includes a stabilizing resistor 452 positioned in series with the dynamic AC resistance 424 such that the load current $I_{OUT}$ passes through the stabilizing resistor as well as the current sensing resistor 200. The stabilizing resistor can be considered to be part of the LED load 110 and is used to effectively change the AC resistance of the LED load. With the added stabilizing resistor, which has a resistance value of $R_{STABILIZER}$, the ripple component of the output current $I_{OUT}$ is calculated in accordance with the following Equation (7):

$$I_{RIPPLE} = \frac{V_{RIPPLE}}{R_{AC\_LED} + R_{STABILIZER}} \quad (7)$$

If the resistance value of the stabilizing resistor 452 is selected to be much greater than the dynamic AC resistance of each LED in the LED load 110 (e.g., $R_{STABILIZER} \gg R_{AC\_LED}$), Equation (7) simplifies to the following Equation (8):

$$I_{RIPPLE} = \frac{V_{RIPPLE}}{R_{STABILIZER}} \quad (8)$$

For example, the stabilizing resistor may have a resistance ranging from about 10 times the magnitude of the AC resistance of the load to over 100 times the AC resistance of the load. Accordingly, as used herein, a second magnitude "much greater than" a first magnitude denotes the second magnitude being at least 10 times greater than the first magnitude.

Equation (8) shows that the ripple in the output current can be reduced substantially by setting the resistance $R_{STABILIZER}$ of the stabilizing resistor 452 to a large value; however, increasing the resistance of the stabilizing resistor also increases the power wasted in the stabilizing resistor and thus reduces the overall efficiency of the LED driver 100. In one embodiment, the maximum power dissipation in the stabilizing resistor is selected to be approximately 500 milliwatts. In a particular example, the stabilizing resistor is selected to have a resistance $R_{STABILIZER}$ of approximately 12 ohms, which is about 40 times the AC resistance of 0.3 ohms for the configuration of the LED load 110 having 2 LEDs in series. The resistance of 12 ohms limits the $I^2R$ loss at a nominal output current of 180 milliamps to approximately 389 milliwatts (e.g., 180 mA×180 mA×12 V=389 mW), which is below the selected maximum of 500 milliwatts.

Figure 9:
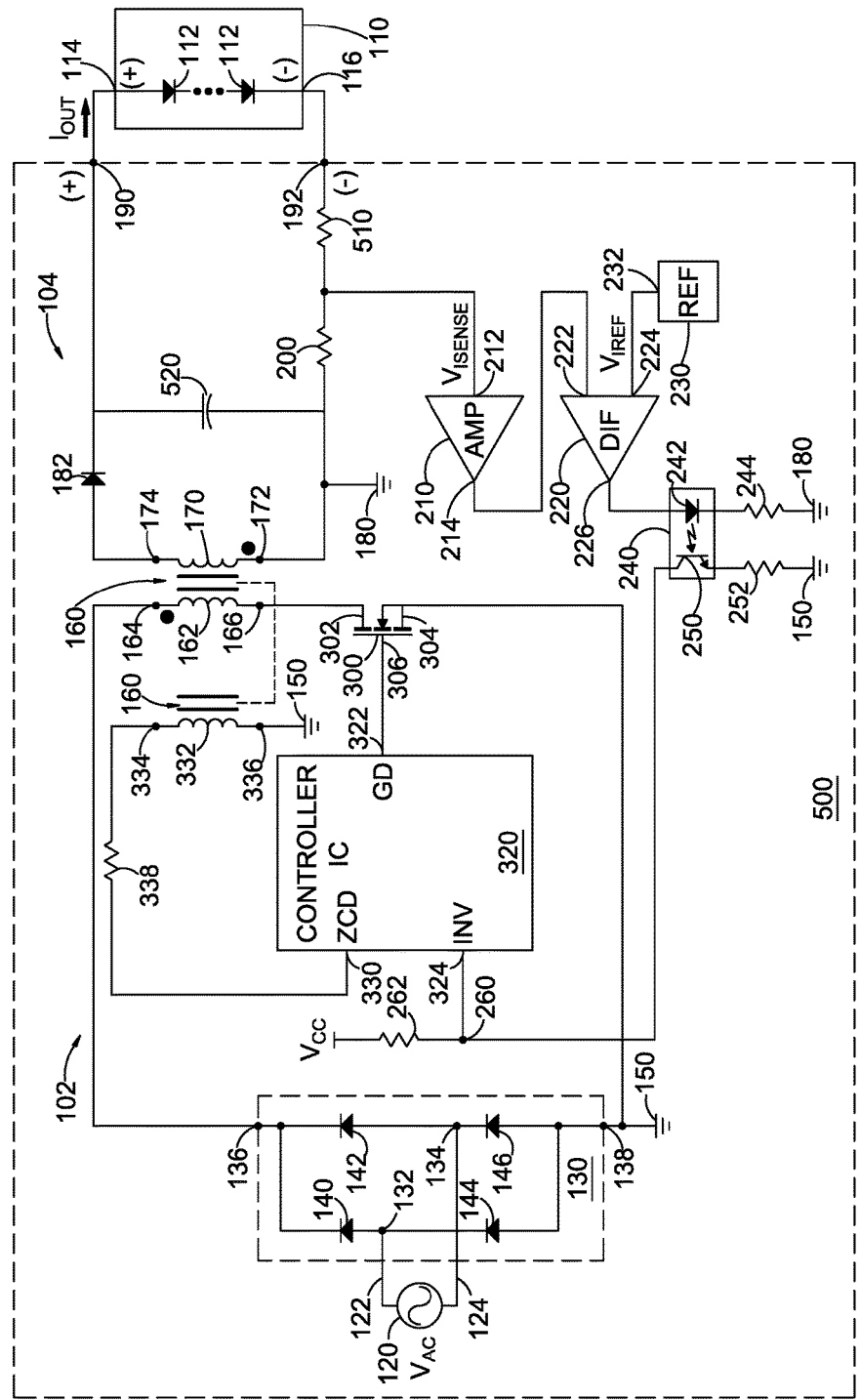
FIG. 9 illustrates an improved LED driver circuit similar to the LED driver circuit of FIG. 1 and further including the stabilizer resistor of FIG. 8 to reduce the ripple in the LED load current.

FIG. 9 illustrates an LED driver 500 generally corresponding to the LED driver 100 of FIG. 1, but with an added stabilizer resistor 510 inserted in the current path of the LED load 110. The other elements in FIG. 9 are numbered as in FIG. 1. In view of the benefit provided by the stabilizer resistor, the secondary filter capacitor 184 of FIG. 1 is replaced with a secondary filter capacitor 520, which has a smaller capacitance (e.g., approximately 1,000 microfarads instead of the previous capacitance of 2,000 microfarads. The beneficial effect of reducing the ripple in the output current through the LED load is shown by the ripple percentages in the following Table 2 in comparison with the ripple percentages shown in the previous Table 1, which is reproduced below. As noted above, the values in Table 1 are produced using the 2,000-microfarad second filter capacitor without the stabilizer resistor, and the values in Table 2 are produce using a 1,000-microfarad capacitor and the 12-ohm stabilizer resistor.

TABLE 1

| No. of LEDs | $I_{OUT\_AVG}$ (mA) | $I_{OUT\_MAX}$ (mA) | $I_{OUT\_MIN}$ (mA) | $V_{OUT}$ (volts) | Ripple (%) |
|---|---|---|---|---|---|
| 5 | 180 | 209 | 150 | 13.86 | 16.11 |
| 4 | 180 | 220 | 149 | 11.1 | 22.22 |
| 3 | 180 | 235 | 145 | 8.4 | 30.56 |
| 2 | 180 | 255 | 143 | 5.6 | 41.67 |

TABLE 2

| No. of LEDs | $I_{OUT\_AVG}$ (mA) | $I_{OUT\_MAX}$ (mA) | $I_{OUT\_MIN}$ (mA) | $V_{OUT}$ (volts) | Ripple (%) |
|---|---|---|---|---|---|
| 5 | 180 | 196 | 156 | 14.2 | 8.89 |
| 4 | 180 | 202 | 151 | 11.4 | 12.22 |
| 3 | 180 | 202 | 154 | 8.6 | 12.22 |
| 2 | 180 | 205 | 150 | 5.8 | 13.89 |

As shown in Table 2, the addition of the stabilizer resistor 510 to the modified driver circuit 500 substantially improves (lowers) the ripple while allowing the capacitance and the physical size of the secondary filter capacitor 520 to be reduced. As further shown in Table 2, the ranges in magnitudes of the output current for each configuration of the LED load 110 are also reduced. In particular, the maximum magnitude of the output current for the configuration with only 2 LEDs is 205 milliamps, which is well within the acceptable current limits for the LEDs.

Figure 10:
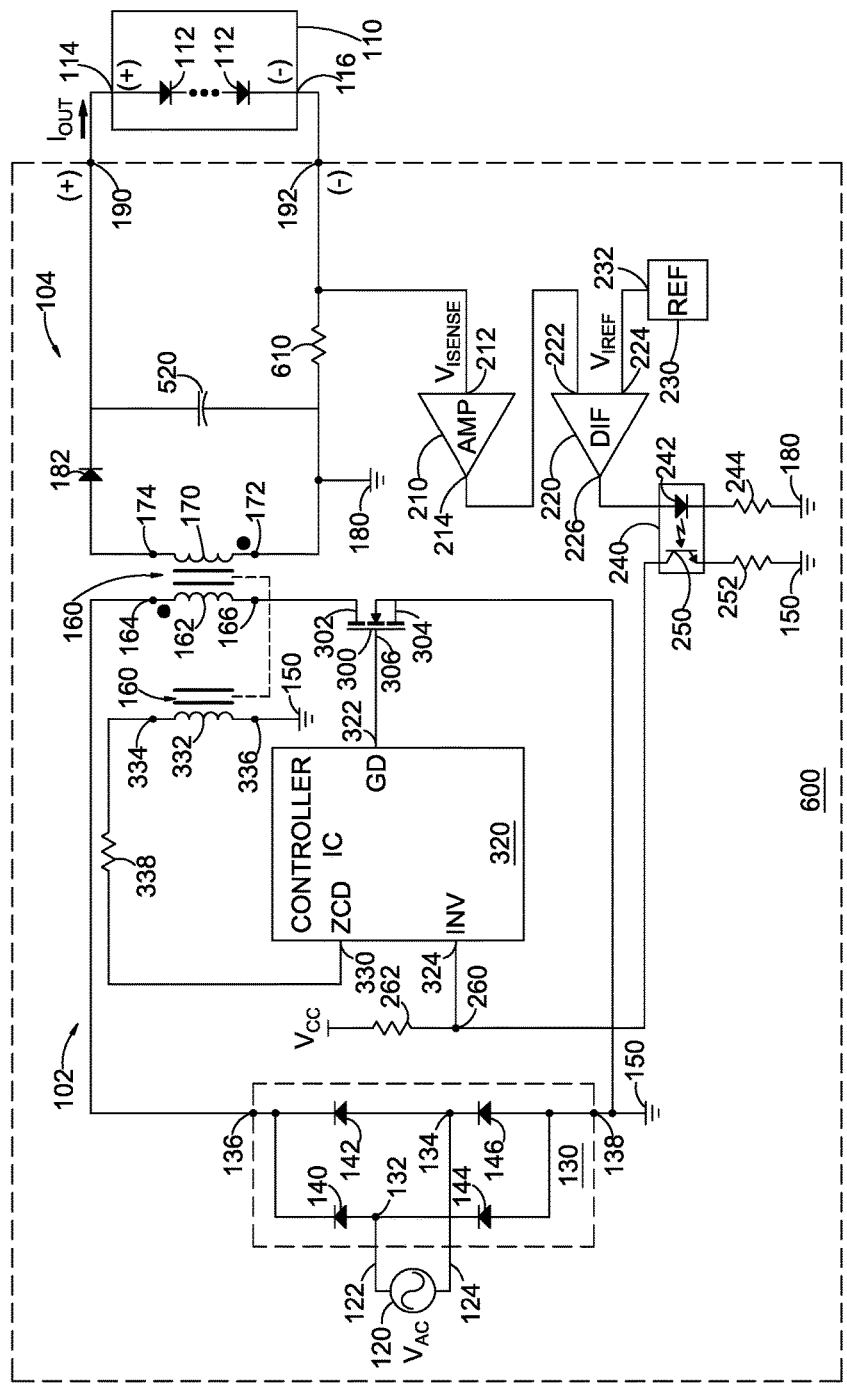
FIG. 10 illustrates a further embodiment of an improved LED driver circuit similar to FIG. 9 with the stabilizer resistor and the current sensing resistor combined into a single combination current sensing and stabilizer resistor.

The resistance stabilization provided by the stabilizer resistor 510 of FIG. 8 can also be accomplished by incorporating the resistance of the stabilizer resistor into the current sensing resistor such that the current sensing resistor has a larger resistance value. FIG. 10 illustrates an LED driver 600 implemented with a 12-ohm current sensing resistor 610 in place of the original low value (e.g., 0.1 ohm) current sensing resistor. The amplification provided by the sensing voltage amplifier 210 may be reduced in view of the greater voltage drop across the higher resistance of the 12-ohm current sensing resistor. Although the separate stabilizer resistor 510 in FIG. 9 need not be a high precision resistor, the current sensing resistor in FIG. 10 should be a high precision resistor (e.g., 1% or better) to provide an accurate voltage representation of the current flowing through the combined current sensing and ripple stabilization resistor.

Figure 11:
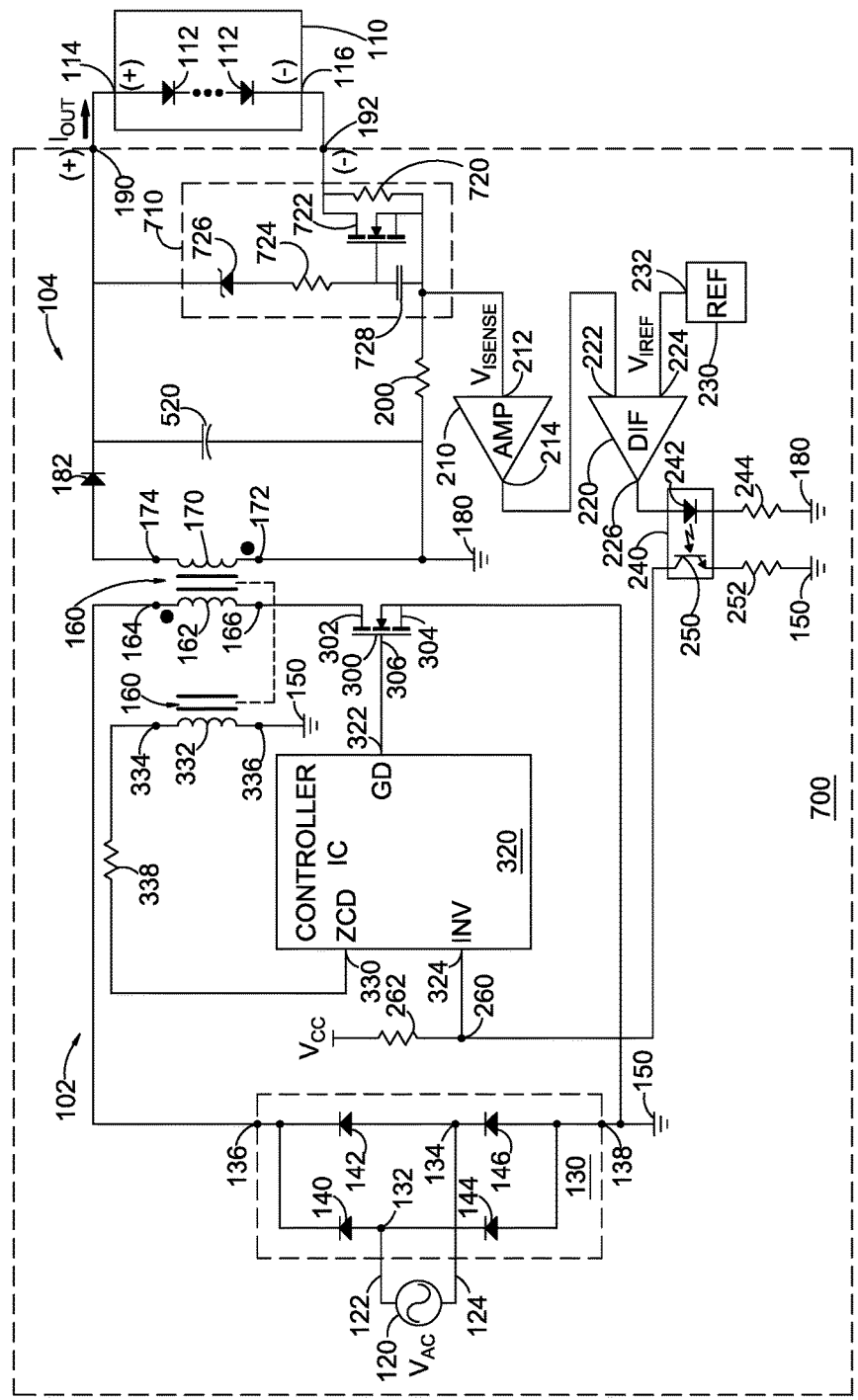
FIG. 11 illustrates a further embodiment of an improved LED driver circuit similar to FIG. 9 with the stabilizer resistor of FIG. 9 replaced with a dynamic stabilization circuit having a stabilizing resistor that is selectively bypassed for LED loads having a greater number of LEDs in series within the load.

As shown in original Table 1, the ripple percentage and the overall range of output current magnitudes for the configuration of the LED load 110 with 4 or 5 LEDs are acceptable without the stabilizer resistor 510 of FIG. 9 or the modified current sensing resistor of FIG. 10. The circuits of FIGS. 9 and 10 consume additional power to reduce the ripple for the 4-LED and 5-LED configurations although the reduction is not needed for some applications. FIG. 11 illustrates an LED driver 700 that provides the ripple control for the 2-LED and 3-LED configurations, but does not provide the ripple control for the 4-LED and the 5-LED configurations. In the embodiment of FIG. 11, the secondary filter capacitor 520 has a capacitance of 2,000 microfarads. The stabilizer resistor 510 of FIG. 9 is replaced in FIG. 11 with a dynamic LED impedance stabilizing circuit 710. The stabilizing circuit has a controlled resistance path connected in series with the LED load and the current sensing resistor 200. The controlled resistance path includes a stabilizing resistor 720 corresponding to the stabilizing resistor 510 of FIG. 9. For example, the stabilizing resistor of FIG. 11 may be a 12-ohm resistor as described above. A gate-controlled semiconductor switch 722 has a drain terminal connected to a first terminal of the stabilizing resistor (e.g., the terminal of the resistor connected to the LED load). The semiconductor switch has a source terminal connected to a second terminal of the stabilizing resistor (e.g., the terminal connected to the current sensing resistor). The semiconductor switch has a gate terminal connected to a first terminal of a gate resistor 724. A second terminal of the gate resistor is connected to the anode of a Zener diode 726. The cathode of the Zener diode is connected to the first (+) output terminal 190 of the LED driver circuit. In the illustrated embodiment, the gate terminal of the semiconductor switch is connected to the source terminal via a high frequency bypass capacitor 728 to reduce the noise on the gate terminal.

In one embodiment, the semiconductor switch 722 comprises a metal oxide semiconductor field effect transistor (MOSFET) that is normally off with when the voltage at the gate terminal has a relatively low magnitude with respect to the voltage at the source terminal. When the voltage at the gate terminal is sufficiently high with respect to the source terminal, the semiconductor switch turns on with a relatively low resistance (e.g., less than 1 ohm) between the drain and source terminals. Thus, when the semiconductor switch turns on, the stabilizer resistor 720 is effectively bypassed.

The value of the Zener diode 726 is selected such that the voltage on the gate terminal of the semiconductor switch is too low to turn on the semiconductor switch when the voltage across the LED load 110 in series with the stabilizer resistor 720 is less than a threshold voltage, such as, for example, 10 volts. Thus, when the LED load is configured with only 2 LEDs or with 3 LEDs, the voltage across the series connection is only about 5.6 volts (2 LEDs) or 8.4 volts (3 LEDs). The voltage is insufficient to turn on the semiconductor switch because of the voltage drop through the Zener diode. Thus, the stabilizer resistor is electrically in series with the LED load, and the driver circuit 700 operates in accordance with the respective 2-LED or 3-LED row in Table 2 with further reductions in the respective ripple percentages because the capacitance of the secondary filter capacitor 520 is 2,000 microfarads in the embodiment of FIG. 11. When the LED load is configured with 4 LEDs or with 5 LEDs, the voltage drop across the LED load and the stabilizer resistor is sufficient (e.g., above the threshold voltage) such that the voltage on the gate terminal of the semiconductor switch turns on the semiconductor switch and bypasses (or partially bypasses) the stabilizer resistor. When the stabilizer resistor is bypassed, the LED driver circuit operates in accordance with the respective 4-LED or 5-LED row of Table 1. The threshold voltage determined by the voltage drop across the Zener diode is selected, for example, to be midway between the voltage drop across 3 LEDs in series and the voltage drop across 4 LEDs in series such that the MOSFET is shut off fully when only 2 LEDs or 3 LEDs are in the LED load and such that the MOSFET turned on fully when 4 LEDs or 5 LES are in the LED load. The value of the Zener diode and the corresponding threshold voltage may also be chosen such that the semiconductor switch only turns on and bypasses the stabilizer resistor when the LED load is configured with 5 LEDs such that the voltage across the LED load and the stabilizer resistor is greater than, for example, 13 volts.

The LED driver circuit 700 of FIG. 10 provides the benefit of reduced ripple at the lower loads (e.g., with 2 LEDs or 3 LEDs in the LED load 110) in combination with a smaller loss of system efficiency at greater loads (e.g., with 4 LEDs or 5 LEDs in the LED load.

The previous detailed description has been provided for the purposes of illustration and description. Thus, although there have been described particular embodiments of the present invention of a new and useful "Dynamic AC Impedance Stabilization in a Flyback LED Driver," it is not intended that such references be construed as limitations upon the scope of this invention except as set forth in the following claims.

What is claimed is:

1. A drive circuit for providing a load current to a load having an AC resistance, the drive circuit comprising:
   an isolation transformer, which includes a primary winding and a secondary winding;
   a flyback converter controller configured to selectively apply a pulsing DC voltage to the primary winding of the isolation transformer to generate a current in the secondary winding of the isolation transformer;
   a diode coupled to the secondary winding of the isolation transformer, the diode configured to provide a rectified secondary current;
   a secondary filter capacitor coupled to receive the rectified secondary current, the secondary filter capacitor including a first capacitor terminal and a second capacitor terminal;
   a first output terminal coupled to the first capacitor terminal, and a second output terminal coupled to the second capacitor terminal, the first and second output terminals connectable to a load to provide a current path for a load current between the secondary filter capacitor and the load;
   a current sensing circuit coupled to the current path to sense a magnitude of the load current and to provide a feedback signal to the flyback converter, the flyback converter responsive to the feedback signal to control the pulsing DC voltage to the primary winding of the isolation transformer to thereby control the magnitude of the load current, the load current including an AC ripple superimposed on an average DC current, the AC ripple having a magnitude inversely responsive to the AC resistance of the load, wherein the current sensing circuit includes a current sensing resistor in the current path; and
   a stabilizing resistance connected in the current path, the stabilizing resistance having a resistance value selected to be much greater than a minimum AC resistance of the load connected between the first and second output terminals, wherein the stabilizing resistance is a dynamic resistance connected in series with the sensing resistor in the current path, the dynamic resistance responsive to a voltage across the first and second output terminals, the dynamic resistance having a first resistance value when the voltage across the first and second output terminals is below a threshold voltage, the dynamic resistance having a second resistance value when the voltage across the first and second output terminals is at least as great as the threshold voltage, the first resistance value much greater than the second resistance value and wherein the dynamic resistance comprises:
      a stabilizing resistor having the first resistance value, the stabilizing resistor connected in series with the sensing resistor in the current path;
      a semiconductor switch including a controlled conduction path connected across the stabilizing resistor, the semiconductor switch including a control input terminal responsive to a control input voltage to selectively turn on the controlled conduction path and apply a low resistance across the stabilizing resistor; and
      a control input circuit that provides a control voltage to the control input terminal of the semiconductor switch, the control input circuit responsive to a load voltage between the first output terminal and the second output terminal to generate a first control voltage to the control input terminal to turn on the semiconductor switch when the load voltage is above a threshold voltage and to generate a second control voltage to the control input terminal to turn off the semiconductor switch when the load voltage is below the threshold voltage.

2. The drive circuit for providing a load current to a load as defined in claim 1, wherein the first resistance value of the stabilizing resistance is at least 10 times the minimum AC resistance of the load.

3. The drive circuit for providing a load current to a load as defined in claim 2, wherein the first resistance value of the stabilizing resistance is at least 40 times the minimum AC resistance of the load.

4. The drive circuit for providing a load current to a load as defined in claim 1, wherein:
   the load comprises light-emitting diodes (LEDs) connected in series; and
   the threshold voltage is greater than a total forward voltage across a first number of LEDs in series and is less than total forward voltage across a second number of LEDs in series, the second number of LEDs in series being one greater than the first number of LEDs in series.

5. A drive circuit for providing a load current to a load having an AC resistance, the drive circuit comprising:
   a current source configured to generate an output current having a nominal DC magnitude between a first output terminal and a second output terminal, the output current varying with respect to the nominal DC magnitude by a time-varying ripple magnitude responsive at least in part to the AC resistance of a load connectable between the first output terminal and the second output terminal;
   a current sensing circuit that senses a magnitude of the output current and that generates a feedback signal to the current source responsive to the magnitude of the output current, the current source responsive to the feedback signal to maintain the magnitude of the output current at or near a selected magnitude, wherein the current sensing circuit includes a current sensing resistor in the current path; and
   a stabilizing resistance connected in a current path from the current source to at least one of the first and second output terminals, the stabilizing resistance having a resistance value much greater than a minimum AC resistance of a load couplable to the first and second output terminals, wherein the stabilizing resistance is a dynamic resistance connected in series with the sensing resistor in the current path, the dynamic resistance responsive to a voltage across the first and second output terminals, the dynamic resistance having a first resistance value when the voltage across the first and second output terminals is below a threshold voltage, the dynamic resistance having a second resistance value when the voltage across the first and second output terminals is at least as great as the threshold voltage, the first resistance value much greater than the second resistance value, wherein the dynamic resistance comprises:
      a stabilizing resistor having the first resistance value, the stabilizing resistor connected in series with the sensing resistor in the current path;
      a semiconductor switch including a controlled conduction path connected across the stabilizing resistor, the semiconductor switch including a control input terminal responsive to a control input voltage to selectively turn on the controlled conduction path and apply a low resistance across the stabilizing resistor; and a control input circuit that provides a control voltage to the control input terminal of the semiconductor switch, the control input circuit responsive to a load voltage between the first output terminal and the second output terminal to generate a first control voltage to the control input terminal to turn on the semiconductor switch when the load voltage is above a threshold voltage and to generate a second control voltage to the control input terminal to turn off the semiconductor switch when the load voltage is below the threshold voltage.

6. The drive circuit for providing a load current to a load as defined in claim 5, wherein the first resistance value of the stabilizing resistance is at least 10 times the minimum AC resistance of the load.

7. The drive circuit for providing a load current to a load as defined in claim 6, wherein the first resistance value of the stabilizing resistance is at least 40 times the minimum AC resistance of the load.

8. The drive circuit for providing a load current to a load as defined in claim 5, wherein:

the load comprises light-emitting diodes (LEDs) connected in series; and the threshold voltage is greater than a total forward voltage across a first number of LEDs in series and is less than total forward voltage across a second number of LEDs in series, the second number of LEDs in series being one greater than the first number of LEDs in series.

* * * * *